US012802194B2

(12) United States Patent
Giera et al.

(10) Patent No.: US 12,802,194 B2
(45) Date of Patent: Nov. 17, 2026

(54) MANUFACTURING PROCESS MONITORING AND INSPECTION BASED ON COREGISTRATION OF DIVERSE SENSOR DATA

(71) Applicant: Lawrence Livermore National Security, LLC, Livermore, CA (US)

(72) Inventors: Brian Giera, Oakland, CA (US); Michael E. Zelinski, Oakland, CA (US); Steven Joseph Guzorek, Livermore, CA (US); Alex Caviness, Oakland, CA (US); Andrew Le Nguyen, Oakland, CA (US); William Louis Smith, Oakland, CA (US); Shelby Jean Lampshire, Pleasanton, CA (US); Terence Hall, Tracy, CA (US); Brian Thomas Weston, San Francisco, CA (US); Hamed Ziad Ammar, Oakland, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 1205 days.

(21) Appl. No.: 17/828,920

(22) Filed: May 31, 2022

(65) Prior Publication Data

US 2023/0386007 A1 Nov. 30, 2023

(51) Int. Cl.

*G06T 7/00* (2017.01)
*G05B 19/418* (2006.01)

(52) U.S. Cl.

CPC ........ *G06T 7/0004* (2013.01); *G05B 19/4183* (2013.01); *G05B 19/4188* (2013.01)

(58) Field of Classification Search

CPC .................................................... G06T 7/0004
See application file for complete search history.

(56) References Cited

U.S. PATENT DOCUMENTS 9,965,865 B1 5/2018 Agrawal et al.
10,198,823 B1 2/2019 Agrawal et al.
(Continued)

FOREIGN PATENT DOCUMENTS

CN 113232300 A 8/2021
EP 2942132 A1 11/2015
(Continued)

OTHER PUBLICATIONS

Halsey, W., R., et al., Localized Defect Detection from Spatially Mapped, In-Situ Process Data With Machine Learning, 2021 Front. Mech. Eng 7:767444. doi: 10.3389/fmech.2021.767444, 14 pages.
(Continued)

*Primary Examiner* — Benjamin O Dulaney
(74) *Attorney, Agent, or Firm* — Perkins Coie LLP

(57) ABSTRACT

A method of manufacturing a physical object comprises, during a process of manufacturing the physical object by a machine, capturing image data of at least a portion of the physical object and other sensor data related to the machine or to the at least a portion of the physical object. The method further comprises, during the process of manufacturing the physical object, for each of the plurality of pixels of the image data, coregistering the image data with the other sensor data on a pixel-by-pixel basis, storing the coregistered image data and other sensor data in association with each other in a data structure, and using at least a portion of the coregistered image data and other sensor to detect an anomaly in the physical object or in the process of manufacturing the physical object.

22 Claims, 12 Drawing Sheets

(56) References Cited

U.S. PATENT DOCUMENTS

| | | | | |
|---|---|---|---|---|
| 10,786,948 | B2 * | 9/2020 | Dave | B29C 64/153 |
| 2019/0187688 | A1 | 6/2019 | Cella et al. | |
| 2019/0272441 | A1 | 9/2019 | Song et al. | |
| 2019/0291345 | A1 * | 9/2019 | Boyer | B22F 10/32 |
| 2020/0110399 | A1 | 4/2020 | Cella et al. | |
| 2020/0276669 | A1 * | 9/2020 | Dardis | B29C 64/153 |
| 2021/0365016 | A1 * | 11/2021 | Hasanian | G01N 29/4472 |
| 2021/0379666 | A1 | 12/2021 | Dave et al. | |
| 2021/0398338 | A1 * | 12/2021 | Philion | G06T 7/55 |
| 2022/0143704 | A1 * | 5/2022 | Tran | B22F 12/90 |
| 2022/0405874 | A1 * | 12/2022 | Barbour | G06V 10/44 |
| 2022/0415059 | A1 * | 12/2022 | Smolyanskiy | G06N 3/0464 |
| 2023/0221708 | A1 * | 7/2023 | Liu | B33Y 50/00 700/109 |
| 2025/0073783 | A1 * | 3/2025 | Fisher | B33Y 40/00 |

FOREIGN PATENT DOCUMENTS

| | | | |
|---|---|---|---|
| WO | 2022012796 | A1 | 1/2022 |
| WO | 2022028753 | A1 | 2/2022 |

OTHER PUBLICATIONS

Paquit, C., V., "Peregrine: An Advanced Data Analytics Tool for Powder Bed Additive Manufacturing," Oak Ridge National Laboratory, retrieved May 11, 2022, https://www.ornl.gov/technology/202004726.

International Search Report and Written Opinion mailed Sep. 15, 2023, for International Patent Application No. PCT/US2023/023441.

* cited by examiner

MANUFACTURING PROCESS MONITORING AND INSPECTION BASED ON COREGISTRATION OF DIVERSE SENSOR DATA

STATEMENT REGARDING FEDERALLY SPONSORED RESEARCH

This invention was made with Government support under Contract No. DE-AC52-07NA27344 awarded by the United States Department of Energy. The Government has certain rights in the invention.

FIELD OF THE INVENTION

At least one embodiment of the present invention pertains to manufacturing techniques, and more particularly, to a technique for manufacturing monitoring and inspection of a manufacturing process based on coregistration of diverse sensor data.

BACKGROUND

Manufacturing processes are inherently subject to variance, and consequently, the quality of manufactured parts or assemblies is inherently variable. Therefore, part inspection is routinely performed in manufacturing processes to assess whether a manufactured part meets all specifications within tolerance. However, the specific inspection protocol can vary from process to process and/or part to part.

For instance, a high throughput assembly line that produces identical versions of the same part may require inspection of only a small, but statistically significant/representative, fraction of the final product to forecast part quality and production efficiency of an entire lot. Conversely, inspection may occur for every part for high value boutique production or in additive manufacturing (AM) processes where the part design can be varied at every fabrication step. Also, quality inspection can occur throughout a build process and/or after part fabrication is complete. Irrespective of how it is implemented, inspection remains critical to—and often is a major bottleneck in—manufacturing processes in terms of part assessment, process qualification, error, and root cause analysis, etc.

In this context, there are many forms of inspection. Inspection can be characterized in terms of, for example, the sensing probe used, e.g., contactless (confocal scans, photography, hyperspectral imagery, x-ray scanning, etc.), contact (kinematic or electrical resistance probes), or both. Such sensing probes can collect the necessary measurements for parameters such as geometric dimensioning and tolerance, mass, density, minimum thickness, friction coefficient, color, chemical composition, electrical properties, smell, or whatever comprehensive set of specifications that must be met. Depending on the quality metric(s), the inspection process can be non-destructive or destructive, e.g., yield stress of a support beam. Digital cameras represent a ubiquitous sensing modality and likely will remain so, especially due to the advent of machine learning and computer vision based classification and regression algorithms that readily extract quality metrics from images or video, i.e. sequences of images.

A variety of hardware and sensors may be needed to fully qualify a part that undergoes inspection. For each inspection task, there is often complementary analysis that extracts signal(s) from the relevant sensor(s) and ultimately compares the measurement(s) to some specification(s). In conventional manufacturing inspection processes, however, data streams are treated separately, for example, using images to identify surface defects, using infrared (IR) probes for inspecting temperature throughout a build, using machine motion profiles to examine tool paths, etc.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Overview

Figure 1:
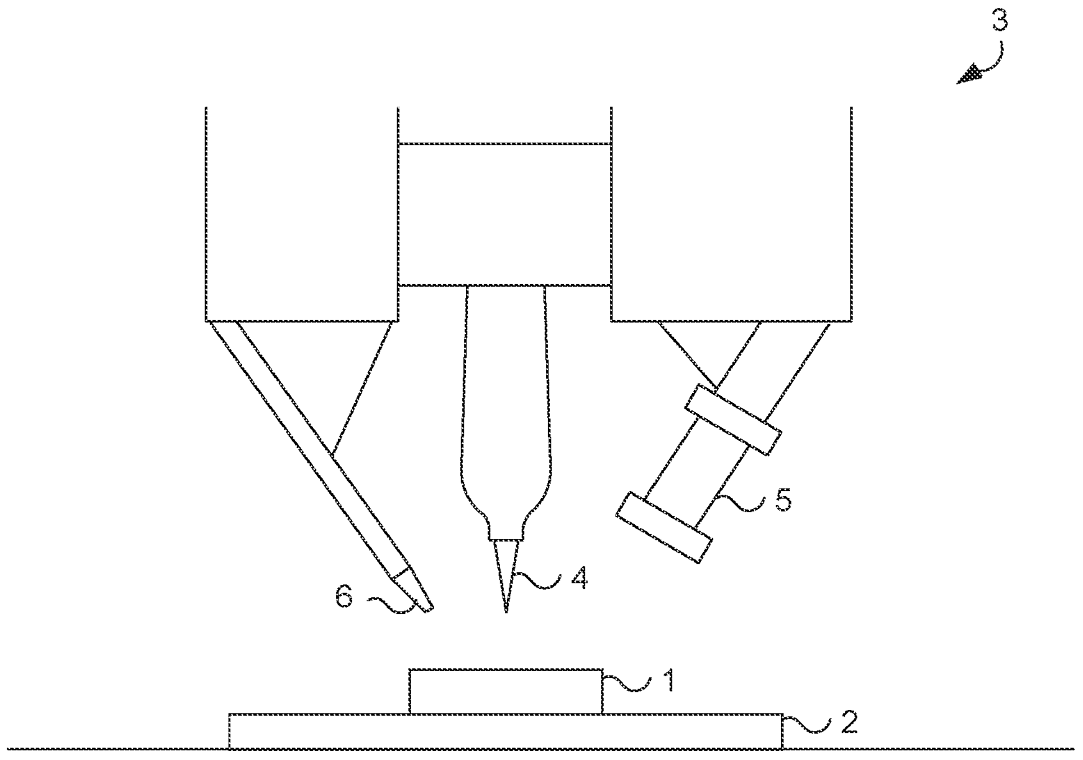
FIG. 1 illustrates a portion of a direct ink write additive manufacturing (DIW-AM) system.

As noted above, in conventional manufacturing inspection processes, data streams are treated separately. Consequently, conventional manufacturing inspection methods do not leverage the salient information from each respective data stream for a given quality metric. Introduced here, therefore, is a technique for coregistering, or "fusing," data streams from various sensing modalities in any given manufacturing process. The technique systematically and intuitively marries layer-wise images with other in situ sensor data. The result is a rich image-like tensor with information beyond what is captured by a standard two-dimensional image comprising grayscale or color (e.g., RGB) pixels. The technique can add readings from one or more sensors collected at each location in an image to every pixel in the image. Merging all data that is collected from a sensor suite with image pixel data yields a synergistic data structure that offers all the benefits of spatial depiction alongside (possibly higher-frequency) information gathered by sensors.

The technique introduced here can operate at any scale and thus can be performed: (a) with sensing suites that can contain any number of sensors and in which a camera can be considered a sensor; (b) on each frame of a movie (which is just a temporal series of images); (c) using imaging set-ups that include multiple and/or different types of cameras, e.g., grayscale, color, multispectral, hyperspectral, etc.; and/or (d) using sensing data collected at any time, irrespective of when image(s) are taken.

Since the generated tensor has higher and better quality information density than standard images, actionable insights into manufacturing and inspection processes are more readily extractable via advanced analytical approaches (e.g. computer vision, machine learning, process modeling, etc.). For example, combined image and sensor data can be used to generate alerts of manufacturing defects, to trigger corrective actions, and/or to produce rich, multi-parameter graphics, tables, etc.

The technique introduced here can be applied in many different fields and contexts. One example application is part and process quality control for additive manufacturing (AM) (also called "3D printing"), particularly in direct ink write (DIW) AM (DIW-AM), as further described below. Note, however, that the technique introduced here is not limited to AM. In general, the technique introduced here can be used to provide improved inspection capabilities and routines, process monitoring, improved/accelerated quality detection of additive and traditional manufacturing process traceability, rapid closed-loop control, scientific and physics-guided machine learning, on-machine metrology, and in-situ data and process monitoring.

In at least some implementations, the technique introduced here includes a method of manufacturing a physical object. The method can comprise, during a process of manufacturing the physical object by a machine, concurrently capturing a) image data of at least a portion of the physical object from an imaging sensor (e.g., a conventional visible-spectrum digital camera), and b) other sensor data related to the machine or to the at least a portion of the physical object. The "other sensor data" can include data from one or more non-imaging sensors (e.g., pressure sensor, temperature sensor, stage positioning and motion, etc.), as well as data from one or more other imaging sensors (e.g., an IR camera). The method further comprises, during the process of manufacturing the physical object, at each of a plurality of points in time, and for each of the plurality of pixels of the image data, coregistering (spatially associating) the image data with the other sensor data on a pixel-by-pixel basis, storing the coregistered image data and other sensor data in association with each other in a data structure, and using at least a portion of the coregistered image data and other sensor to detect an anomaly in the physical object or in the process of manufacturing the physical object. In at least some implementations, the method can further comprise triggering an action in response to detection of an anomaly in the physical object or in the process of manufacturing the physical object.

Coregistering the image data with the other sensor data can comprise, at each of a plurality of points in time, and for each of the plurality of pixels of the image data, associating other sensor data with that pixel. More specifically, the coregistering further can comprise, for each of a plurality of pixels of the image data, identifying a particular pixel to be associated with a particular sensor value of the other sensor data, by: a) for each of a plurality of orthogonal coordinate axes, computing a number of pixels occupied by the physical object in the image data along the coordinate axis, and determining a number of pixels per unit length along the coordinate axis; and b) identifying the particular pixel to be associated with the particular sensor value based on a set of reference position coordinates, current position coordinates of a part of the machine, and the number of pixels per unit length along the coordinate axes.

At least a portion of the coregistered image data and other sensor can be used to detect an anomaly in the physical object or in the process of manufacturing the physical object, by identifying, in the image data of the physical object, a particular pixel indicative of the anomaly, and ascertaining a position coordinate associated with the anomaly, based on a position coordinate of the particular pixel, the number of pixels per unit length along the first coordinate axis and the first reference position coordinate.

Example Implementation

The technique introduced here includes a methodology to combine different classes of sensor data. Consequently, in the technique introduced here, sensor readings and images are registered into the same spatial and temporal frame of reference ("coregistered") to assign to each pixel lighting and/or color intensity values representing the sensor reading (s) recorded at each pixel location. This approach goes beyond different sensors merely recording respective signals versus time, e.g., a digital thermometer, pH probe, humidity sensor, microphone, etc. In the technique introduced here, these types and/or other types of sensors can be registered with a temporal frame of reference, e.g., at the beginning or end of a build (manufacturing process), even if they are collected at different rates. Multiple images (from the same or different cameras) can then be spatially coregistered by use of spatial references within each image, e.g., the edge of a part being manufactured, a fiducial marker, etc., to place them in perspective of each other.

Coregistering an image with data from other sensors involves implementing a routine that starts at a known time point, $t_{known}$, in the manufacturing process. Although $t_{known}$ can be selected at the discretion of the user or designer of the manufacturing process, choosing to perform the following sequence at gown enables the resulting data tensor to be used throughout the process. All images and sensors are referenced against $t_{known}$, irrespective of when data is collected by any of the sensors. In addition to $t_{known}$, a spatial reference point is also used, as described below.

FIG. 1 illustrates an example of a portion 3 of a DIW-AM system in which the technique introduced here can be implemented. As noted, the technique introduced here is not limited in applicability to DIW-AM nor to AM more generally; it can be applied to essentially any other type of system that fabricates a physical object. In FIG. 1, a portion 1 of a part being fabricated sits on a build plate 2. The DIW-AM system includes at least one extruder 4 to extrude material to form the object to be fabricated. The system further includes a camera 5 and one or more other sensors 6 (e.g., temperature sensor, pressure sensor, etc.). The system also includes a computer system (not shown in FIG. 1), which controls the extruder(s) 4 and receives data from the camera 5 and other sensor(s) 6.

Figure 2:
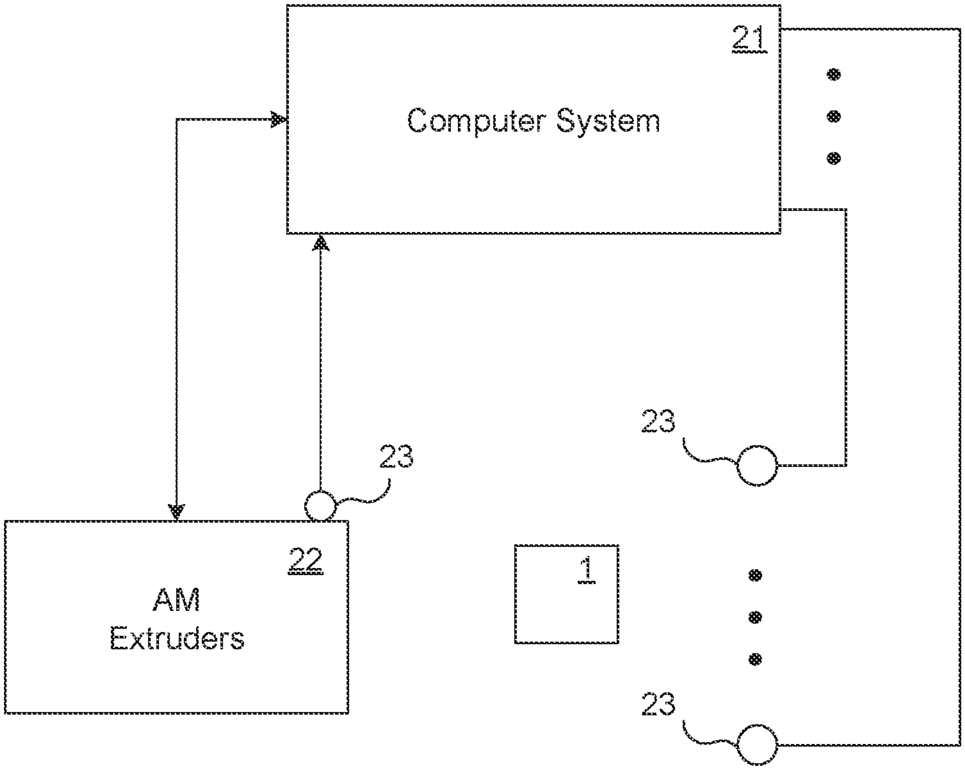
FIG. 2 is a block diagram of a DIW-AM system of FIG. 2.

FIG. 2 is a block diagram of a DIW-AM system such as shown in FIG. 1, further showing the computer system 21. The computer system 21 controls, and may receive feedback from, each of one or more extruders 22, such as (x, y, z) position data. Additionally, the computer system 21 also receives output signals from one or more sensors 23, which can include a conventional visible-spectrum digital camera and one or more other sensors. At least some of the sensors 23 can be mounted on or adjacent to one or more of the extruders 22.

Figure 3:
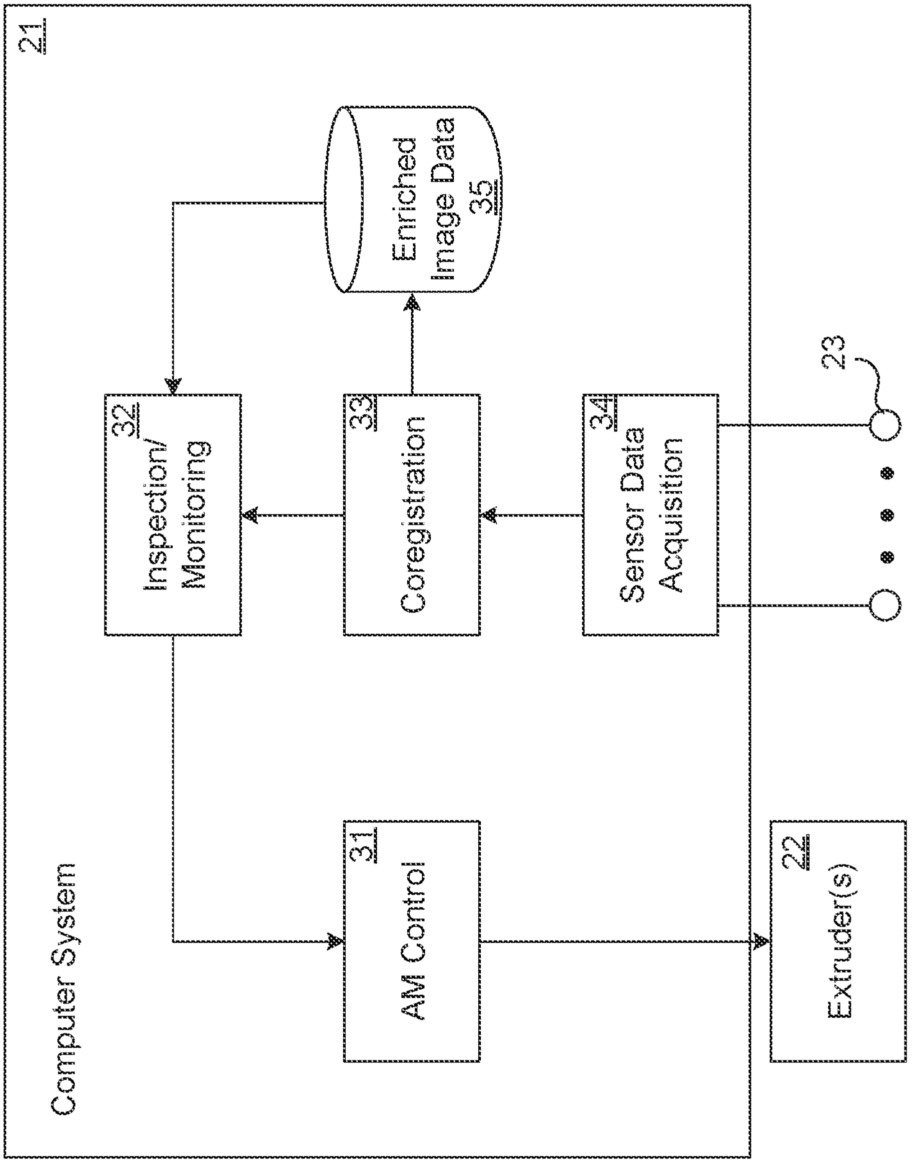
FIG. 3 is a block diagram of the DIW-AM system, showing the computer system in greater detail.

FIG. 3 is a block diagram showing the computer system 21 in more detail. As shown, the computer system 21 in at least some implementations includes an AM control module 31, an inspection/monitoring module 32, a coregistration module 33, a sensor data acquisition module 34, and an enriched image data store 35. The AM control module 31 controls the extruders 22. Control of the extruders 22 by the AM control module 31 may be affected by the output of the inspection/monitoring module 32. For example, if the inspection/monitoring module 32 detects an anomaly in the object being fabricated or in the fabrication process itself, it may send a signal to the AM control module 31 to stop the extruders 22, or to modify the extrusion process. The inspection/monitoring module 32 accesses coregistered image data and other sensor data in the enriched image data store 35. Alternatively or additionally, the inspection/monitoring module 33 receives such data directly from the coregistration module 32, and examines that data for indications of anomalies. In at least some implementations, inspection/monitoring module 32 may employ machine learning and/or other types of artificial intelligence (AI) methods to detect such anomalies. The particular method(s) used by the inspection/monitoring module 32 to detect anomalies is not germane to the technique introduced here and therefore need not be disclosed herein. The sensor data acquisition module 34 inputs signals output by the camera and other sensor(s) and, to the extent necessary, buffers those signals and converts them to a format that is usable by the coregistration module 33 (e.g., by performing analog-to-digital conversion, if the signals are not already in digital format). The coregistration module 33 receives and coregisters digital image data with other digital sensor data, spatially and temporally, using a technique that will be described further below. The coregistered data is stored in the enriched image data store 35.

Figure 4:
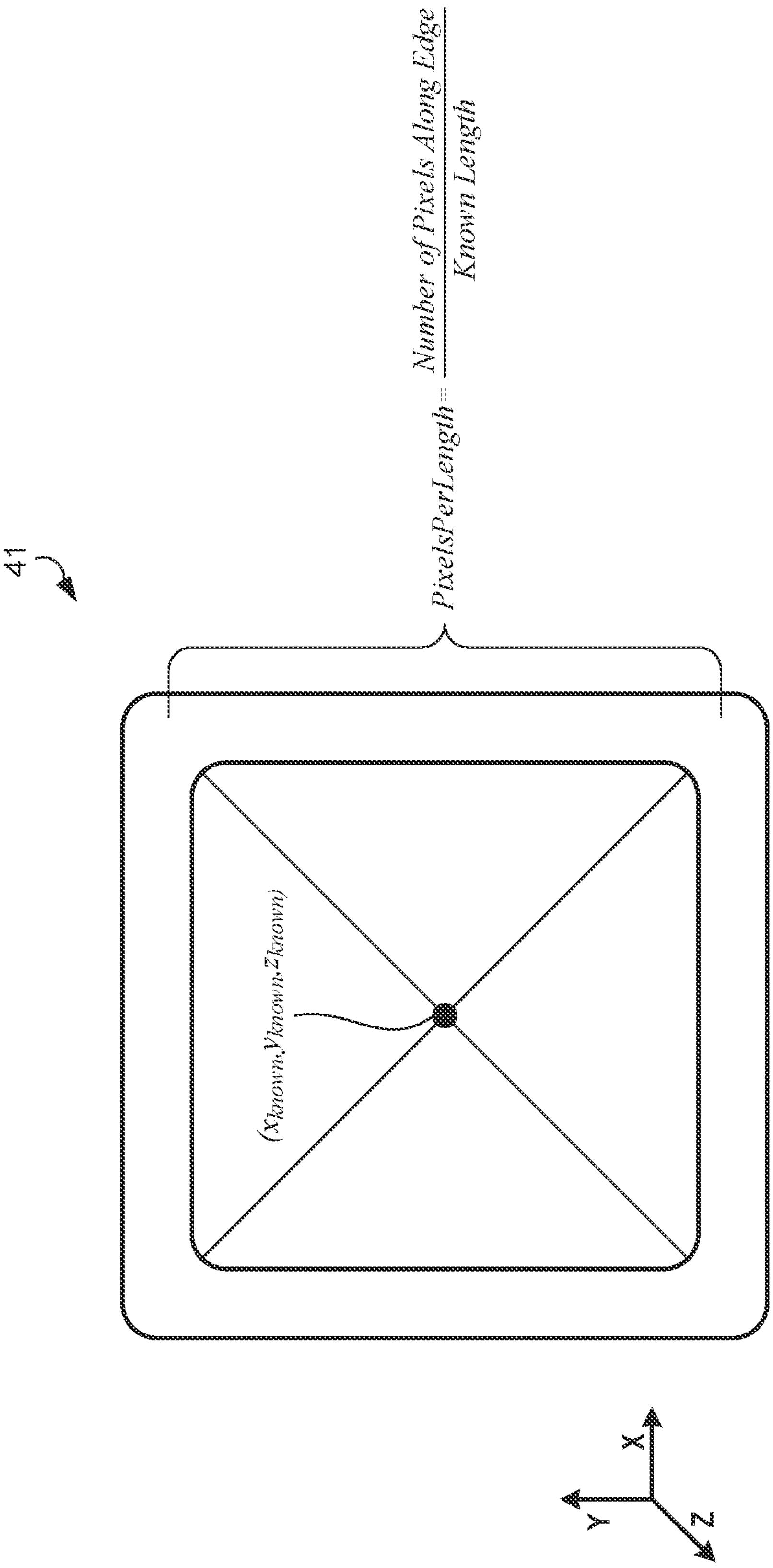
FIG. 4 illustrates a simple example of a part being manufactured by DIW-AM.

FIG. 4 illustrates a simple example of a part being manufactured by DIW-AM, to show how a spatial reference point can be used to associate images with data from other sensors. In FIG. 4, a part 41 that has a simple, substantially square footprint in the x-y plane with a known side length, is 3D-printed by use of software-controlled DIW-AM. In at least some implementations, the technique introduced here begins by ascertaining: (1) the average number of pixels per side of the square in the x-y plane, PixelsPerLength, using all four sides, and (2) the geometric center point of the square ($x_{known}$, $y_{known}$, $z_{known}$) in three orthogonal axes, x, y and z. Any of various conventional image processing algorithms can used to identify these parameters. Based on the computed PixelsPerLength, the technique computes a unit of length (i.e., micron, millimeter, meter, etc.) for any relative motion of a sensor, tool head, motion platform, etc., and/or dimension(s) of a part within an image, based on the number of pixels. Equivalently, PixelsPerLength can be used to compute the number of pixels for any given distance. Another implementation can use a build plate with fiducial(s) on it and/or a set grid pattern to identify a ($x_{known}$, $y_{known}$, $z_{known}$) coordinate and PixelsPerLength in an image. Once these metrics are determined, either the camera's position should remain fixed relative to the build area or corrections can be implemented based on the motion of the camera relative to ($x_{known}$, $y_{known}$, $z_{known}$).

From ($x_{known}$, $y_{known}$, $z_{known}$), $t_{known}$, and PixelsPerLength, any pixel in an image (or portion of an image) can be assigned one or more sensor output values. For example, continuing with the DIW-AM example in FIG. 4, assume at a later time in the build process, the extruder is located at some new location relative to the known reference location, ($x+x_{known}$, $y+y_{known}$, $z+z_{known}$), during which a sensor reading, $S_i(t+t_{known})$, for the ith sensor is collected. From this information, the pixel coordinates of the pixel with which $S_i(t+t_{known})$ is to be associated, can be determined by equation (1):

$$(P_x,P_y)=((x+x_{known},y+y_{known})-(x_{known},y_{known}))\times \text{PixelsPerLength} \quad (1)$$

Since this process works reversibly, if a pixel is known in an image (e.g., a pixel indicative of an anomaly), its spatial coordinates ($x+x_{known}$, $y+y_{known}$) can be determined by equation (2):

$$(x + x_{known},\, y + y_{known}) = \frac{(P_x,\, P_y)}{PixelsPerLength} + (x_{known},\, y_{known}) \quad (2)$$

Equations (1) and (2) assume that an image is taken from a plan (or "bird's eye") view, but can be adapted easily for any camera orientation, i.e., elevation view of the side of part, or using several images for which ($x_{known}$, $y_{known}$, $z_{known}$), $t_{known}$, and PixelsPerLength have been determined. In any case, a sensor output value $S_i(t+t_{known})$ can then be associated with each pixel location along with the pixel's existing intensity and/or color values.

Figure 5:
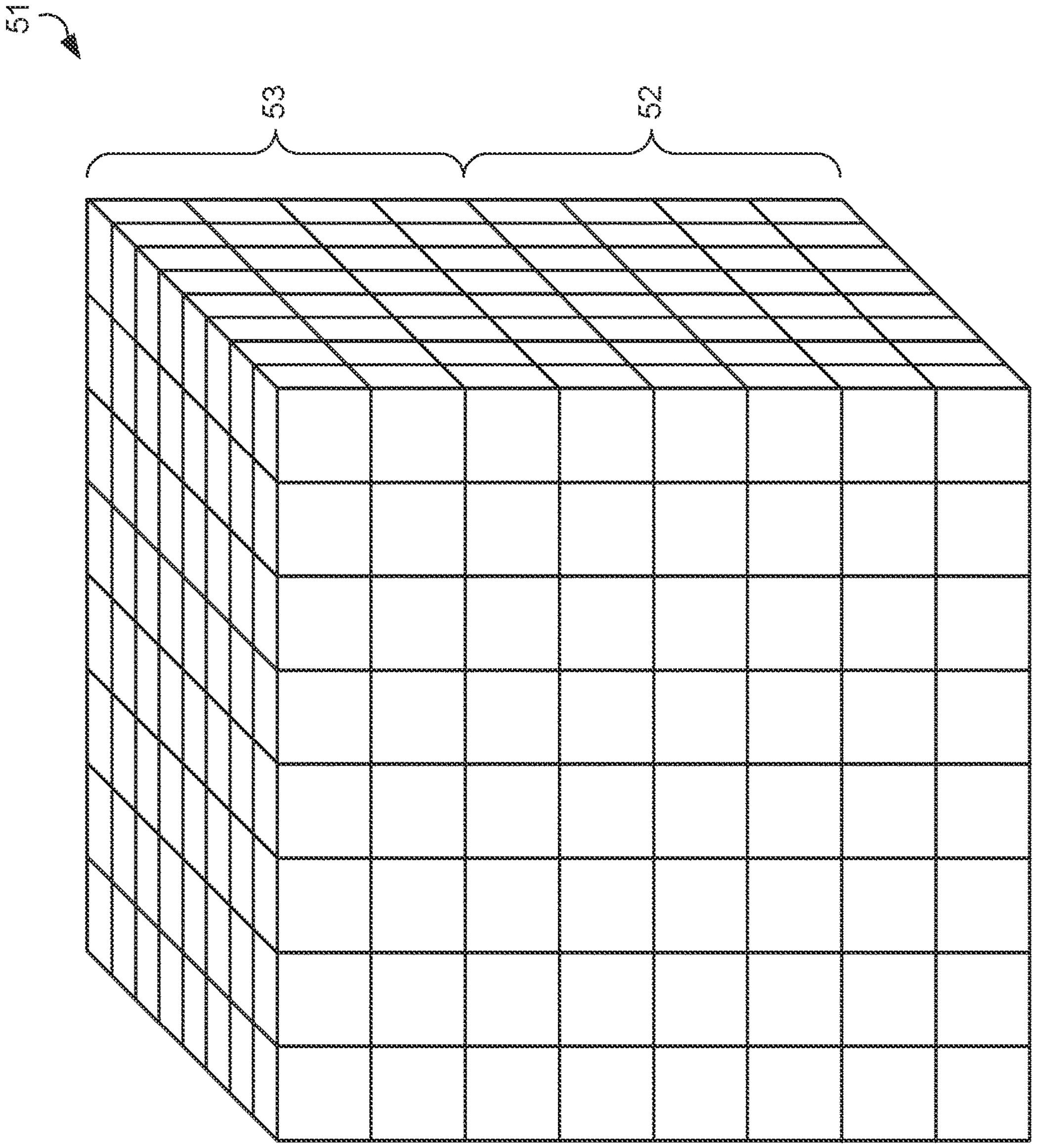
FIG. 5 illustrates a tensor in which other sensor data can be stored in association with pixel data.

FIG. 5 illustrates conceptually an example of how other sensor data can be stored in association with pixel (image) data. A tensor 51 can be used to store the data. One or more dimensions 52 of the tensor 51 can be used to store intensity and color values of individual pixels of a 2D image captured at time $t+t_{known}$. One or more additional dimensions 52 of the tensor 51 can be used to store the output values $S_i(t+t_{known})$ of one or more sensors. Note that while the tensor 51 in FIG. 5 is illustrated as three-dimensional, in practice a tensor used for this purpose can have any number of dimensions (e.g., to accommodate a manufacturing system with any number of sensors). Additional dimensions may be included to store, for example, the z-coordinate of a 2D image (e.g., to identify the relevant layer among successive build layers in an AM process) and/or timestamps indicating when images or other sensor outputs were captured.

The following are some examples of other sensor-based information that can be acquired and coregistered with image data in a tensor in a manufacturing process: temperature, humidity, accelerometer values, machine encoder information (detailing positional, velocity, acceleration, etc. of all motion platforms), local conductivity, vibration, fluid properties, microphone/audio, pressure, tilt, etc. Separate images whose pixel locations can be referenced to ($x_{known}$, $y_{known}$, $z_{known}$) can be combined wherever there is an overlap in their spatial coordinates. Since hyperspectral, multispectral, and IR cameras can capture a broader and/or higher resolution range of the electromagnetic spectrum than conventional visible-spectrum digital cameras, information from these other types of cameras can be used to augment the output of conventional (typically cheaper) cameras where common location(s) can be identified.

Sensors often have differing data collection rates. In the case of probes that scan the surface of what they measure, the scanning rate for each probe is variable and each may have its own data collection frequency. But since pixels in the image have a known length, i.e. 1/PixelsPerLength, and/or there is a known dwell time associated with each pixel, there are several ways to attribute data into each pixel, and the optimal approach will be application and sensor dependent. One method would be to append all non-imaging sensor output values to each pixel, resulting the highest possible data density per pixel. Additionally or alternatively, if multiple readings are taken from a given sensor at different pixels of a given image, the sensor output values can be interpolated to create additional, artificial sensor output values for other pixels that are not spatially aligned with the actual sensor readings. Additionally or alternatively, various statistical metrics can be ascribed to the pixels, such as mean, mode, standard deviation, kurtosis, or any other salient features that can be derived from the distribution of data collected across the each pixel. The image-like data structure such as described above (e.g., a tensor) can be stored in a database for later retrieval and subsequent processing. Such processing can involve reformatting the composition of a pixel, retroactively incorporating collected sensor data, and/or adding new information from offline measurements.

Figure 6:
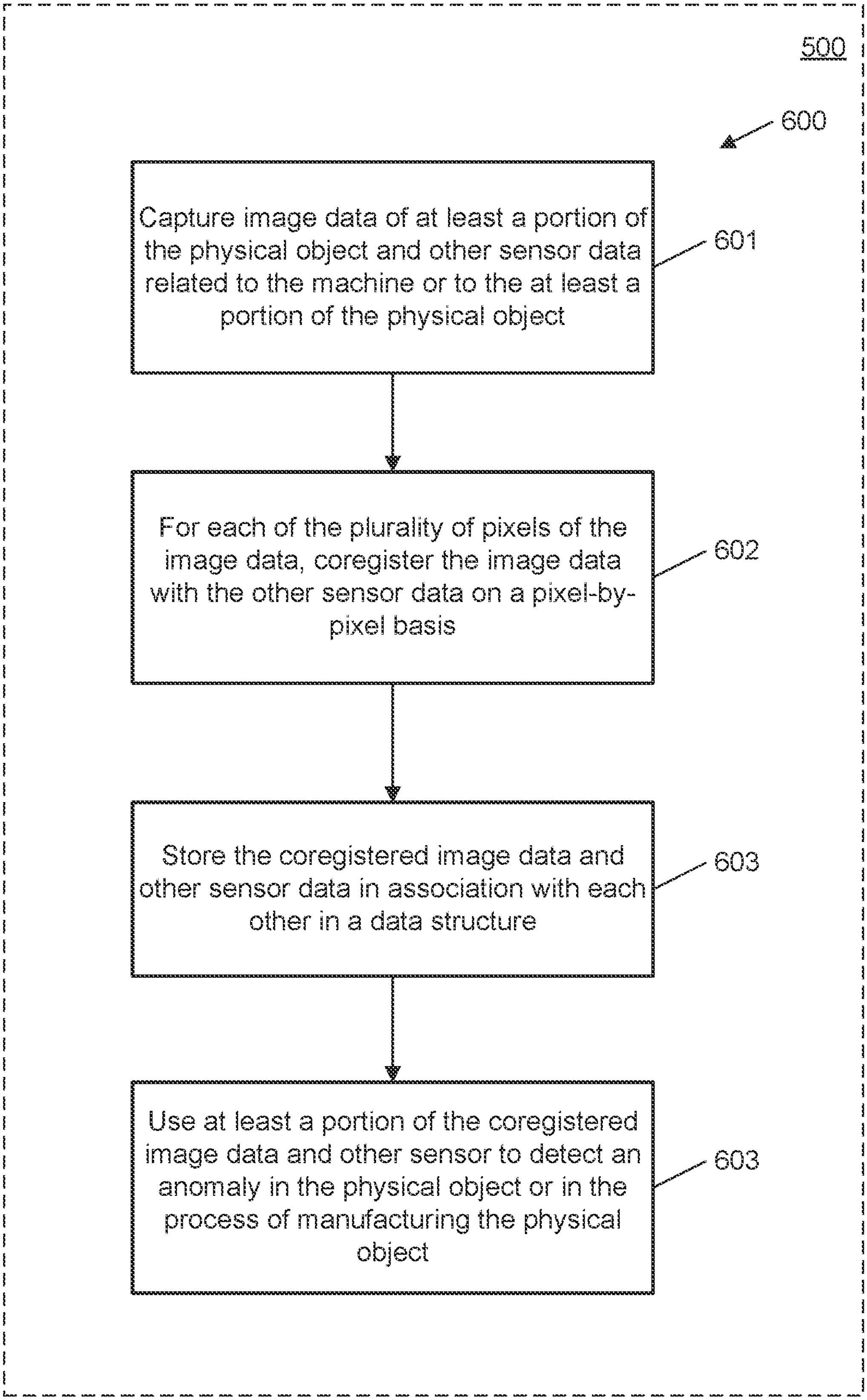
FIG. 6 is a flowchart illustrating an overall process of enabling image data and other sensor data to be coregistered and used.

FIG. 6 is a flowchart illustrating an overall process in accordance with at least some implementations of the technique introduced here. The process 600 may be performed in real time at least partially within and as part of a process 500 of fabricating a physical object (the "build process"). Initially, at step 601 the process 600 captures image data of at least a portion of the physical object and other sensor data related to the machine or to the at least a portion of the physical object. Next, at step 602, for each of the plurality of pixels of the image data, the process coregisters the image data with the other sensor data on a pixel-by-pixel basis. At step 603 the process stores the coregistered image data and other sensor data in association with each other in a data structure, such as a tensor. At step 604 the process uses at least a portion of the coregistered image data and other sensor to detect an anomaly in the physical object or in the process of manufacturing the physical object.

Figure 7:
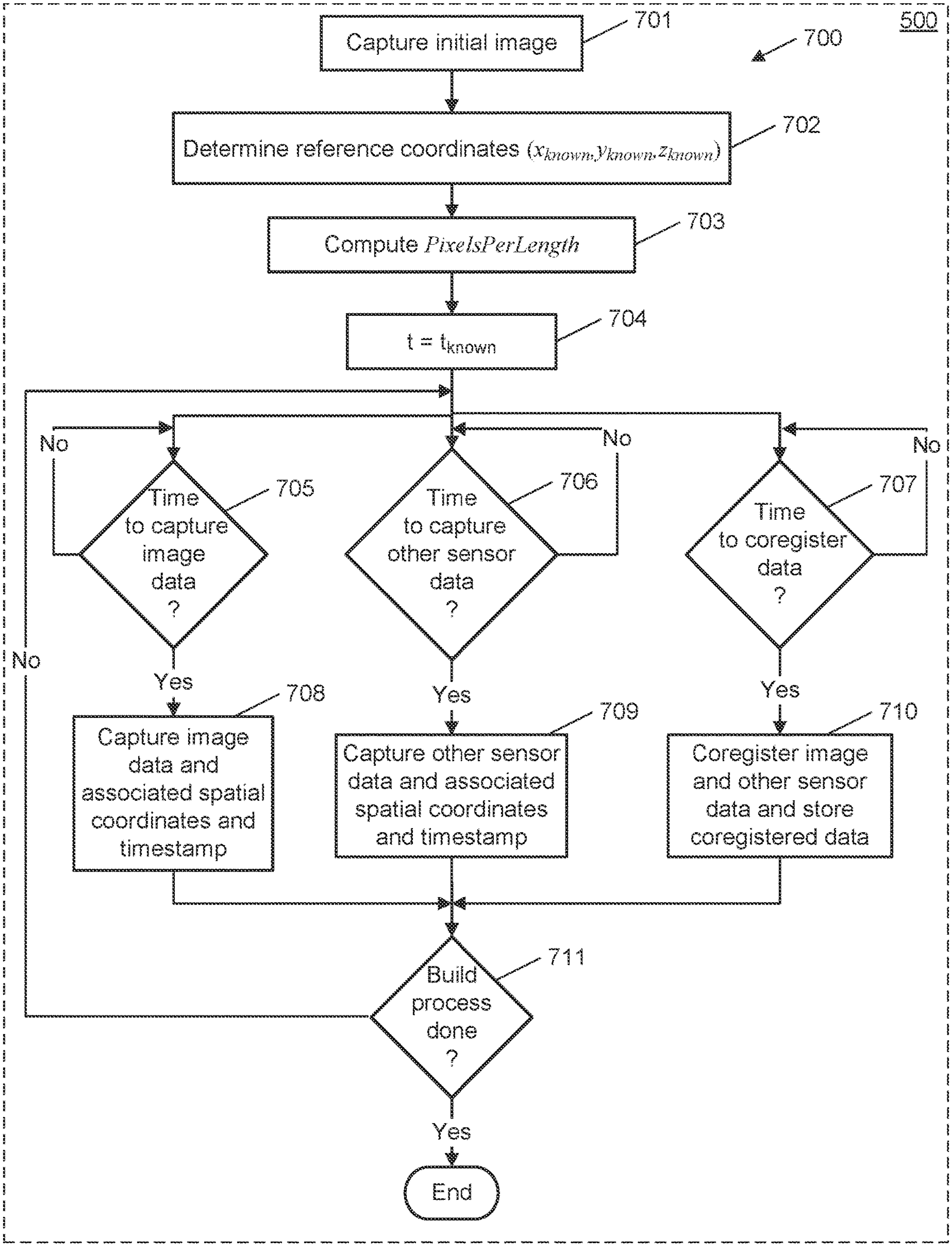
FIG. 7 is a flowchart illustrating an example of a data acquisition and coregistration process.
Figure 8:
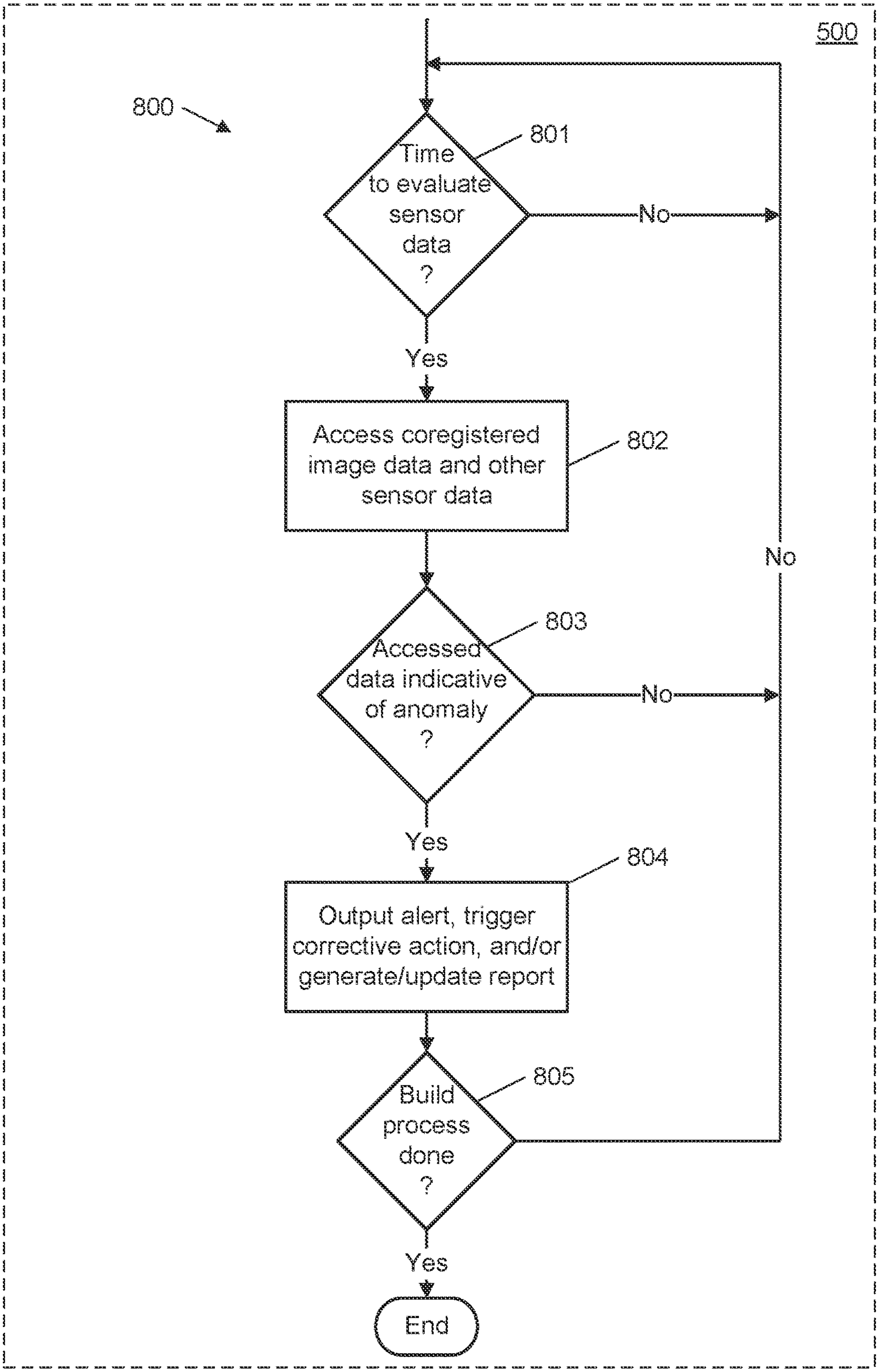
FIG. 8 is a flowchart illustrating an example of a monitoring/inspection process for detecting defects or other anomalies in an object being fabricated and/or in the build process.

FIGS. 7 and 8 illustrate in greater detail portions of the process 600 of FIG. 6, according to at least some implementations. More specifically, FIG. 7 illustrates an example of a data acquisition and coregistration process 700. At least a portion of process 700 can be included within the build process 500 and performed in real-time as part of the build process 500, as shown. The illustrated process is based on an object to be fabricated with a simple, substantially square footprint in the x-y plane. It will be recognized that the process can be modified easily to accommodate objects having other, more complex shapes.

Initially, at step 701 the process 700 captures an initial image of the part to be fabricated. The initial image will be used to ascertain the reference coordinates and dimensions described above. Hence, at step 702 the process determines reference coordinates ($x_{known}$, $y_{known}$, $z_{known}$). These coordinates can be any known coordinates. For example, in the case where the object has a simple square outline (as shown in FIG. 4), the coordinates could be, for example, the geometric center of the object in the x-y plane at a given z value, such as z=0. Next, at step 703 the process computes PixelsPerLength, which is the average number of pixels per side of the object, in the x-y plane. Next, at step 704, the timing variable t is set equal to $t_{known}$, after which the data acquisition and coregistration portions of the process begin.

The data acquisition and coregistration portions of the process include capturing image data, capturing other sensor data (i.e., other than image data), and coregistering the image data and the other sensor data. These steps can occur in parallel, and may occur asynchronously to each other. More specifically, the process waits at step 705 until it is time to acquire image data. The timing of image data capture can be based on any of various criteria, such as at set times, at a particular frequency, based on current tool position, based on current stage or layer of the build process, etc. At the appropriate time, t, the image data is then captured along with its associated spatial (x, y, z) coordinates and timestamp (t value) at step 708. The spatial coordinates may correspond to the position of the object or of a portion of the fabrication tool (e.g., the position of an extruder of an AM machine) at the time t at which the data is captured. Similarly to, and in parallel with, steps 705 and 708, the process waits at step 706 until it is time to acquire other (non-image) sensor data. Timing criteria similar to those described in relation to step 705 can be used in step 706. At the appropriate time, the other sensor data is then captured along with its associated spatial (x, y, z) coordinates and timestamp (t value) at step 709. Note that a given system can include multiple imaging sensors and/or multiple non-imaging sensors, at least some of which can capture data asynchronously to the other sensors. Hence, the process flow can include a separate waiting/data-capture branch like steps 706 and 709 for each individual sensor, or for certain groups of sensors.

In parallel with steps 705, 706, 708 and 709, the process also waits at step 707 until it is time to coregister image and other sensor data. At the appropriate time, the image data and other sensor data are coregistered and stored in a data structure, such as a tensor, at step 710. Coregistration assigns non-imaging sensor data to each of one or more pixel values, and can be done, for example, in the manner described above in relation to equation (1) in at least one implementation. The timing of the coregistration can be based on any of various criteria, such as those mentioned above in relation to steps 705, 706, 708 and 709. Other criteria that might be used to trigger coregistration might include the amount of newly acquired data that has not yet been coregistered, the amount of available memory space for buffering not-yet-coregistered data, etc. Following coregistration and storage, if the build process is not yet complete at step 711, the process loops back to steps 705, 706 and 707. Otherwise, the process ends.

Note that in other implementations, the order of the above-described steps may be different. Additionally, in other implementations there may be additional steps and/or some of the above-described steps may be omitted.

FIG. 8 shows an example of a monitoring/inspection process for detecting defects or other anomalies in an object being fabricated and/or in the build process. In the illustrated implementation, the monitoring/inspection process 800 occurs in real-time, as part of the build process 500. In other implementations, however, it can be performed off-line, i.e., and a batch mode based on archived data. At step 801 the monitoring/inspection process 800 waits until it is time to evaluate sensor data, which can include image data, non-image data, or both. The timing of evaluating sensor data can be based on any of various criteria, such as a set schedule, a particular frequency, based on the current position, stage or layer of the fabrication process, etc. at the appropriate time, the process accesses an appropriate subset of the stored coregistered image data and other sensor data, at step 802. The process then determines whether the accessed coregistered data is indicative of an anomaly at step 803. Any of various methods can be used to make this determination, the details of which are not germane to the technique introduced here. If the accessed coregistered data is indicative of an anomaly, the process outputs an alert, triggers a corrective action, and/or generates or updates a report, at step 804.

Next, if the build process is not yet complete at step 805, the process loops back to step 801. Otherwise, the process ends.

Figure 9B:
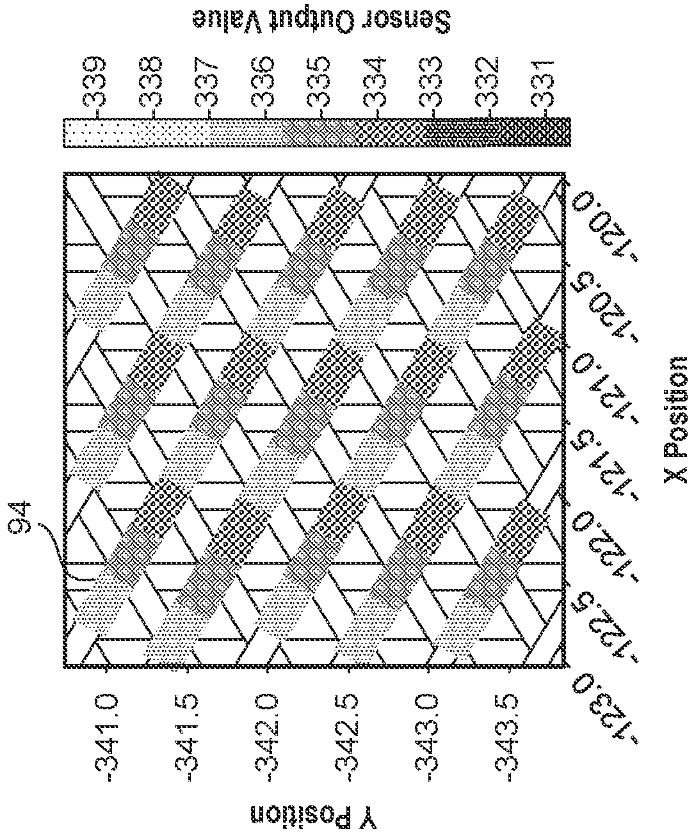
FIG. 9B shows an image of the object where the strands of a particular layer are identified, and a color or shading map representing a sensor-produced data metric is applied to each point in the strands of that layer.
Figure 9A:
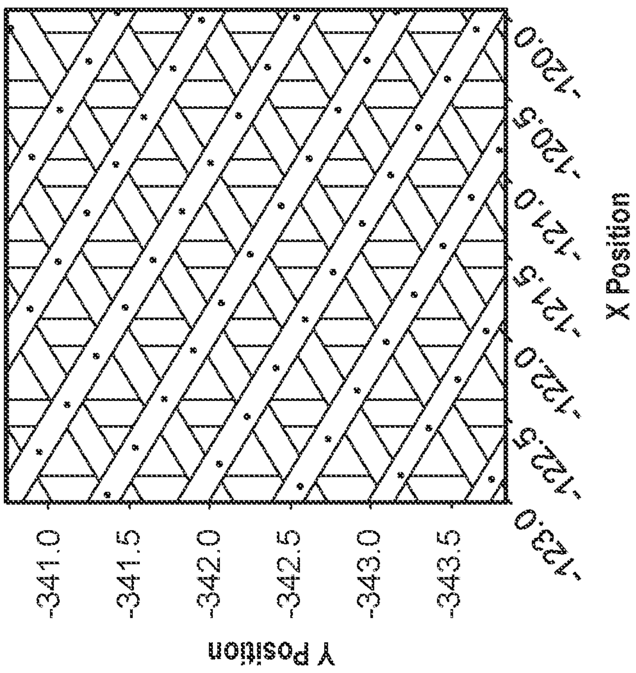
FIG. 9A shows sensor data points overlayed on top of an image of an object being manufactured by a DIW-AM build process
Figure 9D:
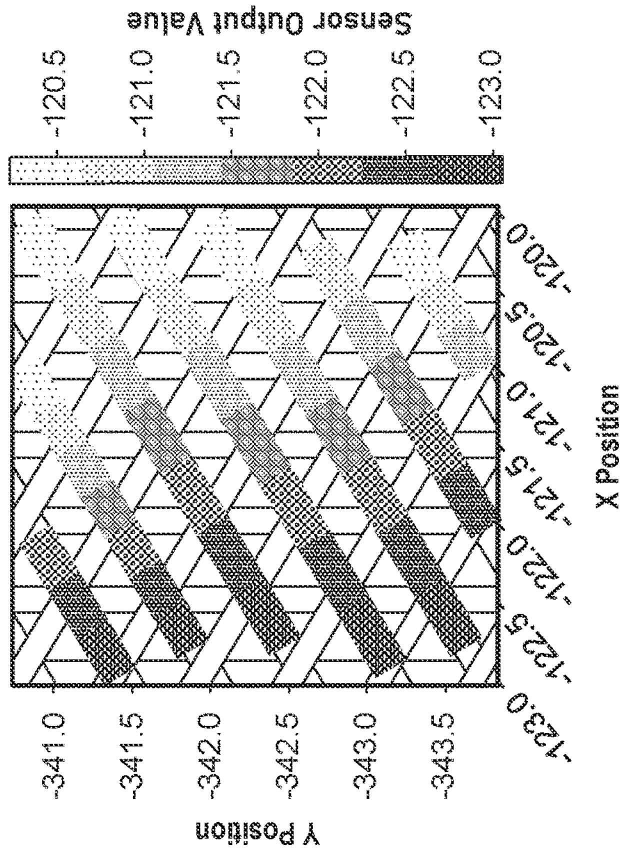
FIGS. 9C, 9D and 9E show additional images of the object in FIGS. 9A and 9B, in which other layers are highlighted.
Figure 9C:
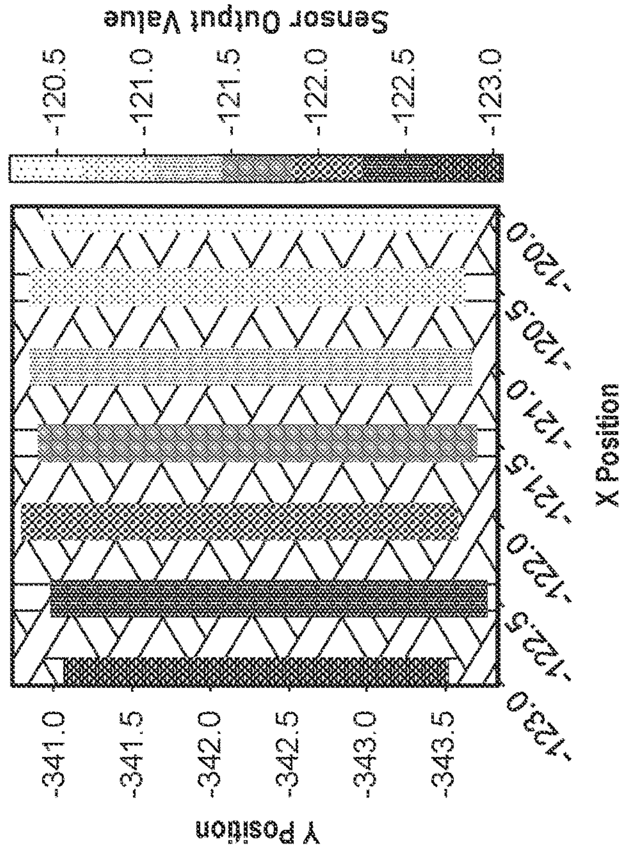
Figure 9E:
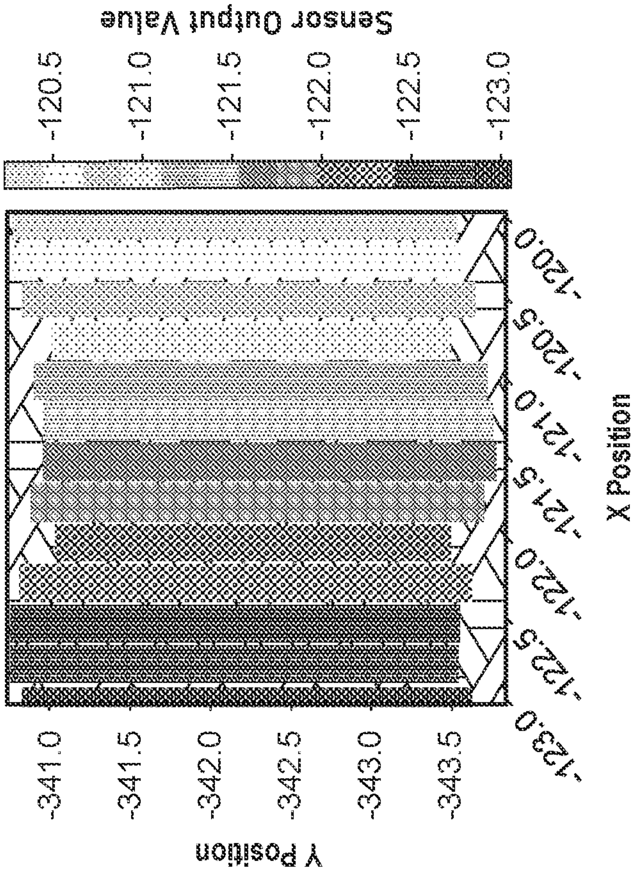

FIGS. 9A through 9E show additional examples of the types of output that can be generated based on coregistered image data and sensor data. In the example of these figures, the object being manufactured comprises several layers, each of which comprises multiple parallel, linear strands of material, where each layer's strands are non-parallel to the strands in the other layers. FIG. 9A shows an example in which multiple sensor data points 91 are overlayed on top of a zoomed image of an object (in the x-y plane) being manufactured by DIW-AM. Interpolated sensor data points can be added between the actual sensor data points to provide a correlation for each (x, y) coordinate on the image. FIG. 9B shows an image of the object in which multiple diagonal strands 94 of a particular layer are visible, and a color or shading representing a sensor-produced data metric is applied, according to a specified color or shading map 95, to each point in the strands 94 of that layer. In the example of FIG. 9B, the data metric could be, for example, a dispenser pressure, a temperature, or any of various other sensor-based data metrics. FIGS. 9C, 9D and 9E show additional images of the object 92, similar to that in FIG. 9B, in which other layers are highlighted.

Figure 10:
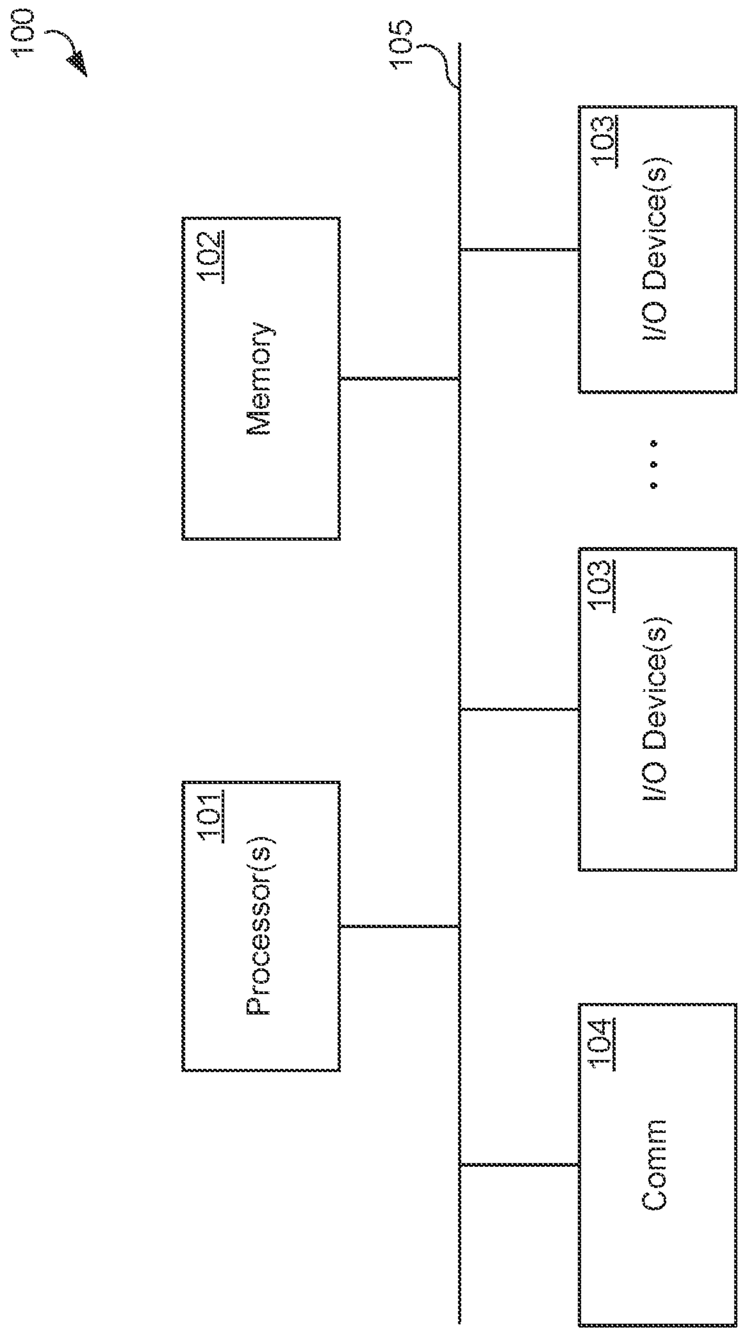
FIG. 10 is a block diagram of a computer system in which the techniques introduced here can be implemented.

FIG. 10 is a high-level block diagram of a computer system in which at least a portion of the technique disclosed herein can be implemented. The computer system 100 in FIG. 10 may represent the computer system 21 in FIGS. 2 and 3. The computer system 100 includes one or more processors 101, one or more memories 102, one or more input/output (I/O) devices 103, and one or more communication interfaces 104, all connected to each other through an interconnect 105. The processors 101 control the overall operation of the computer system 100, including controlling its constituent components. The processors 101 may be or include one or more conventional microprocessors, programmable logic devices (PLDs), field programmable gate arrays (FPGAs), application-specific integrated circuits (ASICs), etc. The one or more memories 102 stores data and executable instructions (e.g., software and/or firmware), which may include software and/or firmware for performing the techniques introduced above. The one or more memories 102 may be or include any of various forms of random access memory (RAM), read-only memory (ROM), volatile memory, nonvolatile memory, or any combination thereof. For example, the one or more memories 102 may be or include dynamic RAM (DRAM), static RAM (SDRAM), flash memory, one or more disk-based hard drives, etc. The I/O devices 103 provide access to the computer system 100 by human user, and may be or include, for example, a display monitor, audio speaker, keyboard, touch screen, mouse, microphone, trackball, etc. The communications interface 104 enables the computer system 100 to communicate with one or more external devices (e.g., an AM fabrication machine and/or one or more remote computers) via a network connection and/or point-to-point connection. The communications interface 104 may be or include, for example, a Wi-Fi adapter, Bluetooth adapter, Ethernet adapter, Universal Serial Bus (USB) adapter, or the like. The interconnect 105 may be or include, for example, one or more buses, bridges or adapters, such as a system bus, peripheral component interconnect (PCI) bus, PCI extended (PCI-X) bus, USB, or the like.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of manufacturing a physical object, the method comprising:
- during a process of manufacturing the physical object by a machine,
  - capturing image data of at least a portion of the physical object and other sensor data related to the machine or to the at least a portion of the physical object;
  - for each of the plurality of pixels of the image data, coregistering the image data with the other sensor data on a pixel-by-pixel basis, wherein identifying a particular pixel to be associated with a particular sensor value of the other sensor data, by, for a first coordinate axis further comprises:
    - computing a number of pixels occupied by the physical object in the image data along the first coordinate axis; and
    - determining a number of pixels per unit length along the first coordinate axis based on the number of pixels occupied by the physical object in the image data along the first coordinate axis; and
    - identifying the particular pixel to be associated with the particular sensor value based on a first reference position coordinate, a first current position coordinate of a part of the machine, and the number of pixels per unit length along the first coordinate axis;

storing the coregistered image data and other sensor data in association with each other in a data structure; and using at least a portion of the coregistered image data and other sensor data to detect an anomaly in the physical object or in the process of manufacturing the physical object.

2. The method of claim 1, further comprising:

triggering an action in response to detection of an anomaly in the physical object or in the process of manufacturing the physical object.

3. The method of claim 1, wherein coregistering the image data with the other sensor data comprises, for each of the plurality of pixels of the image data, associating other sensor data with that pixel.

4. The method of claim 3, wherein coregistering the image data with the other sensor data comprises associating other sensor data with each pixel of the image data for each of a plurality of points in time.

5. The method of claim 1, wherein the coregistering further comprises performing the computing and the determining for a second coordinate axis that is orthogonal to the first coordinate axis, wherein the identifying the particular pixel to be associated with the particular sensor value is further based on a second reference position coordinate, a second current position coordinate of a part of the machine, and a number of pixels per unit length along the second coordinate axis.

6. The method of claim 1, wherein using at least a portion of the coregistered image data and other sensor data to detect an anomaly in the physical object or in the process of manufacturing the physical object comprises:

identifying, in the image data of the physical object, a particular pixel indicative of the anomaly; and ascertaining a position coordinate associated with the anomaly, based on a position coordinate of the particular pixel, the number of pixels per unit length along the first coordinate axis and the first reference position coordinate.

7. The method of claim 1, wherein the data structure comprises a tensor.

8. The method of claim 1, wherein the sensor data comprises image data from at least one non-imaging sensor.

9. The method of claim 1, wherein the sensor data comprises data from a plurality of non-imaging sensors.

10. The method of claim 1, wherein the process of manufacturing the physical object is an additive manufacturing (AM) process.

11. The method of claim 10, wherein the process of manufacturing the physical object comprises a direct ink writing (DIW) process.

12. A non-transitory machine readable storage medium storing instructions, execution of which in a processing system causes the processing system to perform operations associated with a process of manufacturing a physical object by a machine, the operations comprising:

during the process of manufacturing the physical object by the machine, capturing image data of at least a portion of the physical object and other sensor data related to the machine or to the at least a portion of the physical object, wherein the other sensor data includes data from a non-imaging sensor; and coregistering the image data with the other sensor data, wherein the coregistering includes, for each of a plurality of pixels of the image data, identifying a particular pixel to be associated with a particular sensor value of the other sensor data, by for each of a plurality of coordinate axes, computing a number of pixels occupied by the physical object in the image data along the coordinate axis, and determining a number of pixels per unit length along the coordinate axis, and identifying the particular pixel to be associated with the particular sensor value based on a set of reference position coordinates, current position coordinates of a part of the machine, and the number of pixels per unit length along the coordinate axes.

13. The non-transitory machine readable storage medium of claim 12, wherein the operations further comprise:

storing the coregistered image data and other sensor data in association with each other in a data structure; and using at least a portion of the coregistered image data and other sensor data to detect an anomaly in the physical object or in the process of manufacturing the physical object.

14. The non-transitory machine readable storage medium of claim 13, the operations further comprising:

triggering an action in response to detection of an anomaly in the physical object or in the process of manufacturing the physical object.

15. The non-transitory machine readable storage medium of claim 13, wherein using at least a portion of the coregistered image data and other sensor data to detect an anomaly in the physical object or in the process of manufacturing the physical object comprises:

identifying, in the image data of the physical object, a particular pixel indicative of the anomaly; and ascertaining a position coordinate associated with the anomaly, based on a position coordinate of the particular pixel, the number of pixels per unit length along the first coordinate axis and the first reference position coordinate.

16. The non-transitory machine readable storage medium of claim 12, wherein the operations further comprise:

storing the coregistered image data and other sensor data in association with each other in a tensor.

17. A manufacturing system comprising:

a machine to manufacture a physical object;

a plurality of sensors, including an imaging sensor and a non-imaging sensor; and a processing system configured to perform operations during a process of manufacturing the physical object, the operations including acquiring image data of at least a portion of the physical object from the imaging sensor and non-image sensor data from the non-imaging sensor;

for each of the plurality of pixels of the image data, coregistering the image data with the non-image sensor data on a pixel-by-pixel basis, wherein said coregistering includes identifying a particular pixel to be associated with a particular sensor value of the other sensor data, by for each of a plurality of coordinate axes, computing a number of pixels occupied by the physical object in the image data along the coordinate axis, and determining a number of pixels per unit length along the coordinate axis, and identifying the particular pixel to be associated with the particular sensor value based on a set of reference position coordinates, current position coordinates of a part of the machine, and the number of pixels per unit length along the coordinate axes;

storing the coregistered image data and non-image sensor data in association with each other in a data structure; and using at least a portion of the coregistered image data and non-image sensor to detect an anomaly in the physical object or in the process of manufacturing the physical object.

18. The manufacturing system of claim 17, further comprising:

triggering an action in response to detection of an anomaly in the physical object or in the process of manufacturing the physical object.

19. The manufacturing system of claim 17, wherein using at least a portion of the coregistered image data and non-image sensor to detect an anomaly in the physical object or in the process of manufacturing the physical object comprises:

identifying, in the image data of the physical object, a particular pixel indicative of the anomaly; and ascertaining a position coordinate associated with the anomaly, based on a position coordinate of the particular pixel, the number of pixels per unit length along the first coordinate axis and the first reference position coordinate.

20. The manufacturing system of claim 17, wherein the data structure comprises a tensor.

21. The manufacturing system of claim 17, wherein the machine is designed to perform additive manufacturing (AM).

22. The manufacturing system of claim 21, wherein the machine is designed to perform direct ink write (DIW) AM.

* * * * *